United States Patent [19]

Schmidt et al.

[11] Patent Number: 5,653,528
[45] Date of Patent: Aug. 5, 1997

[54] HEADLIGHT FOR A VEHICLE

[75] Inventors: Hans-Joachim Schmidt, Dusslingen; Bert Jenner, Hamburg, both of Germany

[73] Assignee: Robert Bosch GmbH, Stuttgart, Germany

[21] Appl. No.: 573,250

[22] Filed: Dec. 15, 1995

[30] Foreign Application Priority Data

Dec. 17, 1994 [DE] Germany .................. 44 45 223.3

[51] Int. Cl.$^6$ ........................................... H01R 33/00
[52] U.S. Cl. .................. 362/226; 439/592; 439/680; 439/269.2; 439/246
[58] Field of Search ................ 362/226; 439/592, 439/680, 269.2, 246

[56] References Cited

U.S. PATENT DOCUMENTS 5,434,763 7/1995 Hege et al. ...................... 362/226

FOREIGN PATENT DOCUMENTS 4134101 10/1991 Germany .

Primary Examiner—Carroll B. Dority
Attorney, Agent, or Firm—Michael J. Striker

[57] ABSTRACT

A headlight for a vehicle has a housing, a gas discharge lamp arranged in the housing and having an opening, a closing part arranged to close the opening of the housing, a voltage source with which the gas discharge lamp is connectable, a plug connection provided for connecting the gas discharge lamp with the voltage source and including a stationary plug part arranged on the housing and a releasable plug part arranged outside of the housing. The closing part is releasable from outside of the housing for releasing the opening and has an extremity which in a position in which the closing part closes the opening, extends in the plug connection. The releasable plug part is elastically deformable at least in a region and, in an initial condition before its mounting, has a shape in which it is not electrically conductively connectable with the stationary plug part. The releasable plug part during its mounting is brought by the extremity of the closing part by elastic deformation to a mounting form in which it is electrically conductively connectable with the stationary plug part, and the extremity of the closing part when the releasable plug part is mounted is blocked between the releasable plug part and the stationary plug part.

8 Claims, 2 Drawing Sheets

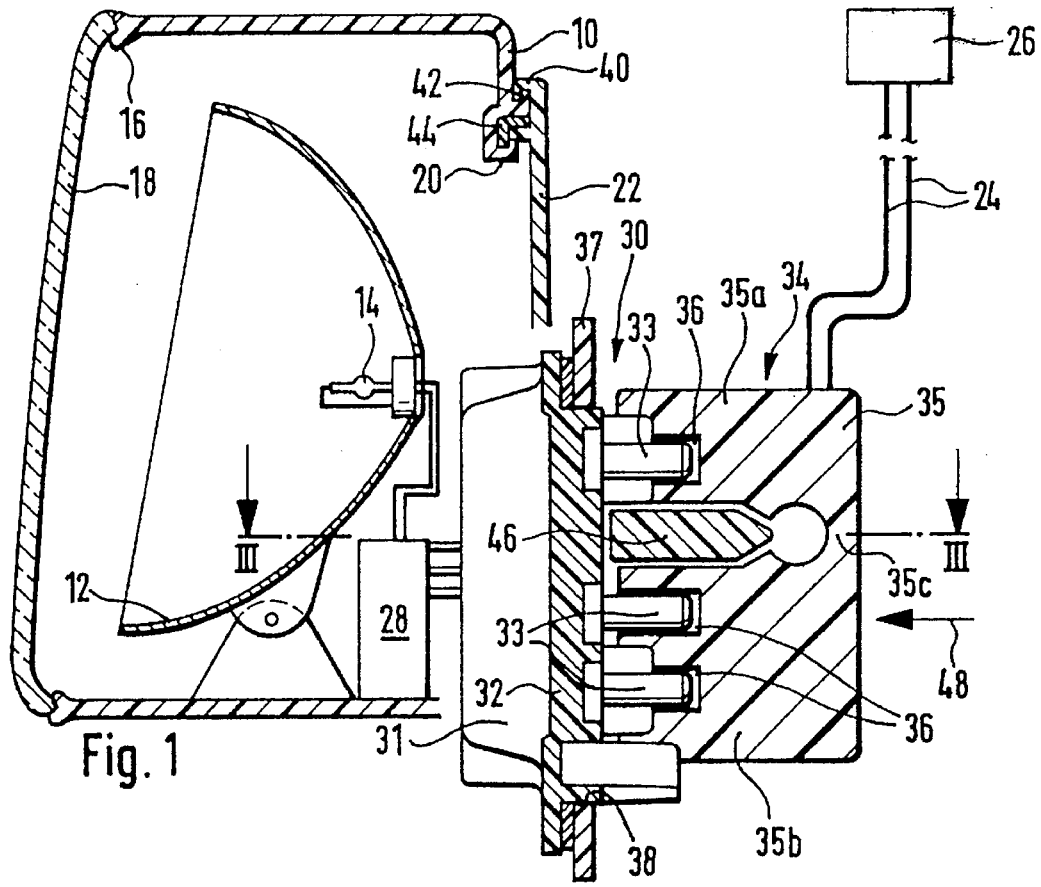
Fig. 1
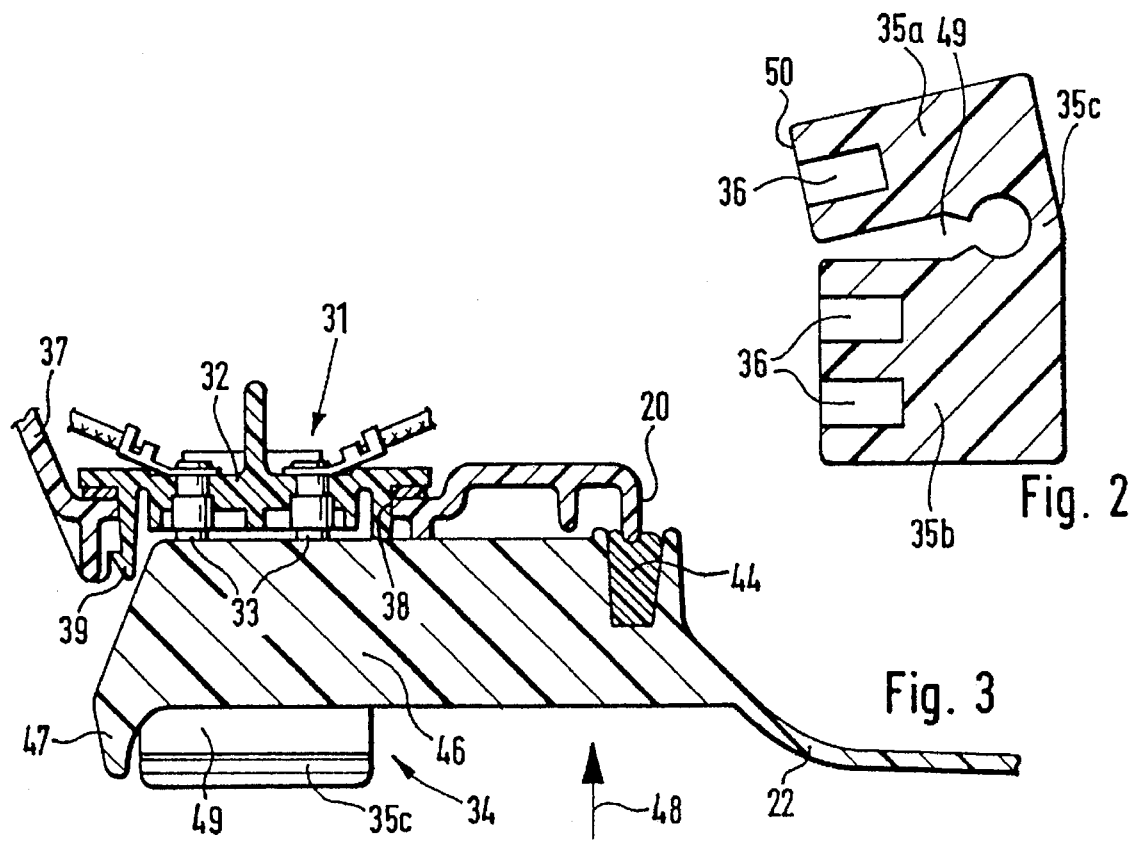
Fig. 2
Fig. 3

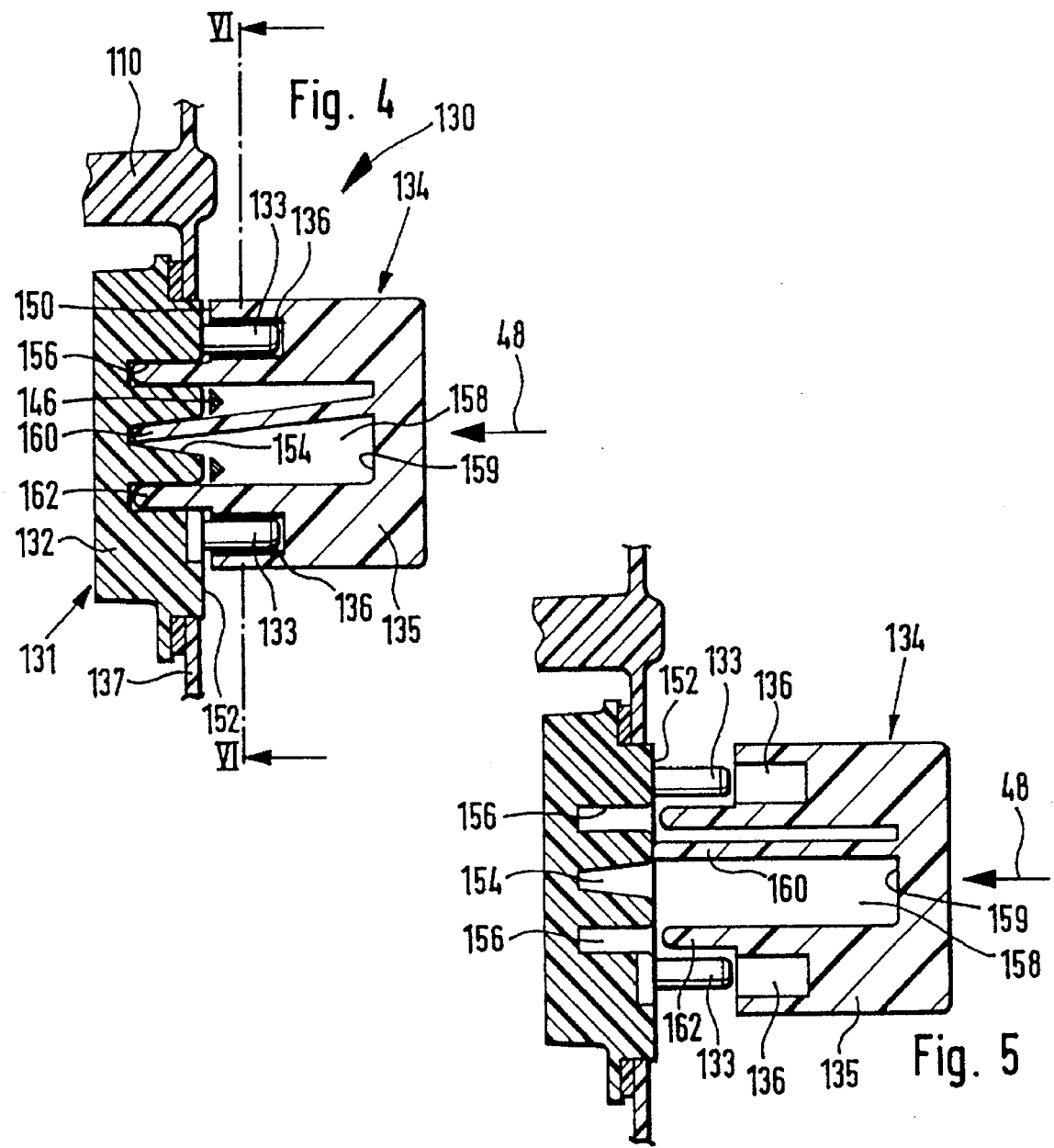
Fig. 4
Fig. 5
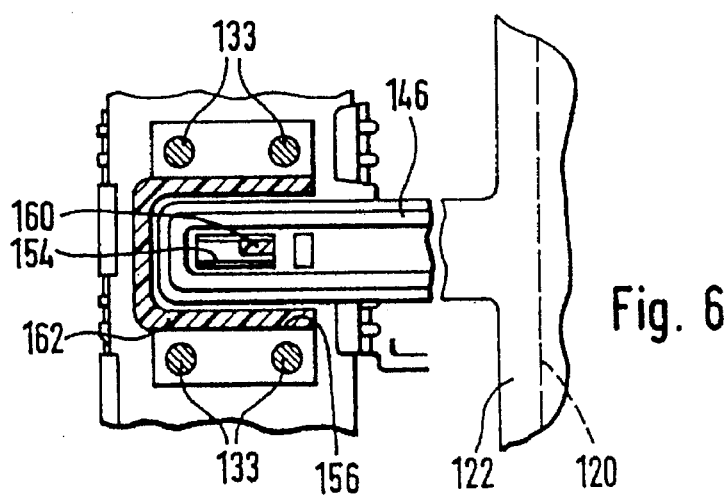
Fig. 6

HEADLIGHT FOR A VEHICLE

BACKGROUND OF THE INVENTION

The present invention relates to headlights for vehicles.

A headlight for a vehicle is disclosed for example in the German document DE 41 34 101 A1. The headlight has a housing and a gas discharge lamp arranged in the housing. The headlight housing is provided on its rear side with an opening which is closed by a housing operating as a closing part and receiving an electrical pre-switching device for the gas discharge lamp. A part of the plug connection of electrical conductors is arranged on the closing part and connects the gas discharge lamp with a voltage source. A high voltage is supplied to the gas discharge lamp in a known manner for its operation. The closing part is mounted on the headlight housing by screws which are available only from the inner side of the headlight housing. Thereby the closing part can be mounted only during the mounting of the headlight and after this can no longer be removed. With this arrangement of the closing part it is guaranteed that the gas discharge lamp or the current conducting parts arranged inside the headlight housing can not be contacted during the operation of the gas discharge lamp, which can be life threatening due to the high voltage. This arrangement of the closing part has however the disadvantage that the interior of the headlight housing after the mounting of the headlight is no longer accessible and therefore an exchange of the gas discharge lamp or another component located inside the headlight housing is no longer possible.

SUMMARY OF THE INVENTION

Accordingly, it is an object of the present invention to provide a headlight for a vehicle of the above mentioned general type, which avoids the disadvantages of the prior art.

In keeping with these objects and with others which will become apparent hereinafter, one feature of the present invention resides, briefly stated, in a headlight for a vehicle with a housing and a gas discharge lamp arranged in it and with a closing part which closes an opening of the housing, and a gas discharge lamp is connectable with a voltage source by a plug connection having one plug part fixed on the headlight housing and another releasable plug part arranged outside the headlight housing, wherein in accordance with the present invention the closing part is releasable from outside of the headlight housing for releasing the opening and has an extremity extending in the plug connection in a position in which the opening is closed, the releasable plug part is elastically deformable at least in some regions and in an initial position before the mounting has a shape in which it is not electrically conductively connectable with a stationary plug part, the releasable plug part during its mounting is brought by the extremity of the closing part in a mounting shape by the elastic deformation in which it is bringable into an electrically conductive state with the stationary plug part and the extremity of the closing part is blocked between the releasable plug part and the stationary plug part in the mounted condition of the releasable plug part.

When the headlight is designed in accordance with the present invention, it has the advantage that the interior of the headlight housing is accessible by the closing part which is releasable from outside of the headlight housing, and at the same time it is guaranteed that the connection of the gas discharge lamp with the voltage source is possible only during the opening of the closing part which closes the headlight housing or during a removal of the closing part for releasing the opening only after the removal of the releasable plug part, or in other words, at a separation of the connection of the gas discharge lamp with the voltage source so that with the removed closing part no danger because of the high voltage is presented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a vertical longitudinal section of a headlight for a vehicle in accordance with a first embodiment of the present invention, with a plug connection shown on an enlarged scale;

FIG. 2 is a view showing a releasable plug part of the plug connection of FIG. 1 in a not mounted condition;

FIG. 3 is a view showing the plug connection in a longitudinal section taken along the line III—III in FIG. 1;

FIG. 4 is a view showing a second embodiment of the plug connection of the inventive headlight in vertical longitudinal section;

FIG. 5 is a view showing a releasable plug part of the plug connection of FIG. 4 in a not mounted condition; and FIG. 6 is a view showing the plug connection in a cross-section along the line VI—VI in FIG. 4.

DESCRIPTION OF THE PREFERRED EMBODIMENTS

A headlight for vehicles shown in FIG. 1, in particular for motor vehicles, is provided for mounting in the chassis of the vehicle. It has a housing 10 with at least one reflector 12 arranged inside the housing. A light source formed as a gas discharge lamp 14 is inserted in the reflector 12. The headlight housing 10 is composed of synthetic plastic material or another suitable material and has a front light outlet opening 16 which is covered with a light-permeable cover disc 18 mounted on a front edge of the headlight housing 10. A rear end of the headlight housing 10 is provided with an opening 20 which is closeable by a releasable closing part 22 formed as a cover. The opening 20 can be arranged in another location of the headlight housing 10, depending on what is convenient for mounting of the headlight in the vehicle.

The gas discharge lamp 14 is connected through one or several electrical conductors 24 formed as flexible cables with a voltage source 26. The voltage source can be the system battery of the vehicle. Additionally, an electrical pre-switching device 28 can be arranged between the gas discharge lamp 14 and the voltage source 26. The pre-switching device 28 connects the direct current of the voltage source 26 into an alternating current and provides the high voltage required for the operation of the gas discharge lamp 14. The electrical pre-switching device 28 can be arranged inside the headlight housing 10 or outside the same. The pre-switching device 28 moreover can be subdivided into an ignition part and a control part. An arrangement of the ignition part inside the headlight housing 10 and an arrangement of the control part outside of the headlight housing 10 can be provided.

The electrical connection of the gas discharge lamp 14 with the voltage source 26 includes a plug connection 30. A first embodiment of the plug connection is shown in FIGS. 1–3. The plug connection 30 is composed of a plug part 31 which is arranged stationary on the headlight housing 10, and a releasable plug part 34 arranged outside of the headlight housing 10. Electrical conductors lead from the stationary plug part 31 inside the headlight housing 10 to the pre-switching device 28 or directly to the gas discharge lamp 14. The stationary plug part 31 has an electrical insulating casing 32 and is arranged on the rear wall 37 of the headlight housing 10 laterally near the opening 20. The casing 32 is preferably composed of synthetic plastic material and can be formed of one piece with the rear wall 37 or mounted on it for example by an arresting connection.

The rear wall 37 has an opening 38 through which a portion of the casing 32 of the plug part 31 extends outwardly. One or several arresting arms 39 are arranged on this portion and engage with the outer side of the rear wall 37. One or several electric contact elements 33 are arranged in the electrically insulating casing 32 of the plug part 31. They are formed as outwardly projecting contact pins. The stationary plug part 31 can be arranged at any location on the periphery of the opening 20, for example it can be located above or below the opening.

For closing the opening 20, the cover 20 is releasably connectable with the headlight housing 10. For releasing the opening 20, it is releasable from outside of the headlight housing 10. The cover 22 can be connectable with the headlight housing 10 for example by an arresting connection and for this purpose has at least one elastically deformable arresting arm 40 which engages behind a corresponding projection 42 on the headlight housing 10 at the edge of the opening 20. The cover 22 can however be mountable by one or several screws or another mounting element on the headlight housing 10, which are available from outside of the headlight housing 10. An elastic sealing element 44 is clamped between the cover 22 and the headlight housing 10. It seals the interior of the headlight housing 10 against the surrounding, in particular against penetration of moisture.

The cover 22 has an extremity projecting from it and formed as an arm 46. When the opening 20 is closed with the cover 22, the arm 46 extends over the edge of the opening 20 and partially overlaps the stationary plug part 31 on the outer side of the headlight housing 10. The arm 46 is rectangular in a cross-section and, in comparison with the longitudinal extension shown in FIG. 3, has a flat cross-section as in FIG. 1. At its edge which faces away from the rear wall 37, the arm 46 narrows as shown in FIG. 1. In particular, it is inclined on its upper side and its lower side. The arm 46 engages with its outer end 47 substantially over the plug part 31 and outwardly, and the end 47 extends from the rear wall 37 over the inclined edge of the arm 46 and outwardly of the edge.

The releasable plug part 34 has an electrical insulating casing 35 in which the contact elements 36 are arranged in the same number as in the stationary plug part 31. They formed as plug sleeves which are open through the end side 50 of the casing 35 of the plug part 34 in the mounting direction 48. Therefore the contact pins 33 can be inserted in the contact sleeves. The end side 50 of the casing 35 of the plug part 34 is open only in the region of the contact sleeves 36. The casing 35 of the plug part 34 is composed of synthetic plastic material and has two shape-stable portions 35a and 35b which are connected with one another as a one-piece structure by an elastically deformable portion 35c. The elastically deformable portion 35c is arranged in the edge of the casing 35 which faces opposite to the mounting direction 48. An intermediate space 49 remains between the portions 35a and 35b and is open in the mounting direction 48.

The intermediate space 49 between the portions 35a and 35b is keyhole-shaped as considered in the longitudinal section in FIGS. 1 and 2. It has a circular region facing opposite to the end which faces in the mounting direction 48. In the not mounted condition of the plug part 34, the portion 35c is deformed so that both portions 35a and 35b converge relative to one another in the mounting direction 48, or in other words the intermediate space 49 between them is smaller in the mounting direction 48. In the illustration of FIG. 2, only the upper portion 35a is inclined downwardly. However, it is also possible that both portions 35a and 35b are inclined toward one another. The end side 50 of the upper inclined portion 35a extends not directly in the mounting direction 48 in its initial position, or in other words before the mounting of the plug part 34.

When the plug part 34 in its initial position in the mounting direction 48 is moved to the stationary plug part 31, without the cover 22 located in the position in which it closes the opening 20, then the plug part 34 with the contact piece 36 of the upper portion 35a does not meet with the associated contact pin 33 of the stationary plug part 31, but instead with the closed end side 35 meets with the contact pin 33. Therefore no connection of the contact sleeve 36 with the contact pin 33 can be established and the gas discharge lamp 14 cannot be connected with the voltage source 26. The portion 35 forms a part of the plug part 35 which is movable by elastic deformation of the portion 35c transverse to the mounting direction 48. In the initial position shown in FIG. 2, the electrically conducting connection of the releasable plug part 34 with the stationary plug part 31 can be established through this movable part. The contact pin 33 associated with the contact sleeve 36 of the portion 35b thereby forms the receptacle for the portion 35a. The portion 35a or its contact sleeve 36 in its initial position is offset relative to the receptacle.

When the cover 22 is located in its position in which closes the opening 20, the arm 46 extends over the stationary plug part 31. During the mounting of the releasable plug part 34 in the mounting direction 48, the arm 46 with its edge which inclines opposite to the mounting direction 48 is inserted in the intermediate space 49 before the end side 50 of the upper casing portion 35a to meet with the contact pin 33. Because of the arm 46, the upper portion 35a is pressed upwardly with elastic deformation of the portion 35c so that it is arranged substantially parallel to the lower portion 35b and its end side 50 faces in the mounting direction 48. The upper portion 35a is located in such a position that its contact sleeves 36 coincide with the associated contact pins 33 of the stationary plug part 31. During further movement of the plug part 34 in the mounting direction 48, the contact pins 33 of the stationary plug part are inserted in the contact sleeves 36 of the plug part 34 so as to establish the electrical connection of the gas discharge lamp 14. The movable part 35a of the plug part 34 is moved with the arm 46 during the mounting of the releasable plug part 34 from its initial position of FIG. 2 to its mounting position of FIG. 1. In this position the part 35a no longer blocks the electrically conductive connection with the stationary plug part 31. The portion 35a or its contact sleeve 36 is then assembled with the contact pin 33 of the stationary plug part 31 which forms the receptacle.

With the mounted releasable plug part 34, the arm 46 of the cover 22 is arranged in the intermediate space 49. A removing of the cover 22 for releasing the opening 20 is then not possible, since the intermediate space 49 is closed opposite to the mounting direction 48 of the plug part 34 by the portion 35c. The outer end 47 of the arm 46 extends out of the intermediate space 49 and engages the portion 35c of the plug part 34 against the mounting direction 48. A removal of the cover 22 is possible when the releasable plug part 34 is dismounted, and thereby the discharge lamp 14 with the voltage source 26 is interrupted.

With the above described plug connection 30 and the cover 22 it is guaranteed that the cover 22 can be removed for releasing the opening 20 only when first the releasable plug part 34 is dismounted and the releasable plug part 34 can no longer be mounted when the cover 22 is located in its position in which it closes the opening 20. The arrangement of the contact pins 33 and the contact sleeves 36 can be reversed. In other words, the stationary plug part 31 can be provided with the contact sleeves, while the reversible plug part 34 can be provided with the contact pins. Correspondingly, in the initial position of the portion 35a of the releasable plug part 34, its contact pin extends on the casing 32 of the stationary plug part 31 and thereby prevents the electrically conductive connection.

The plug connection 130 in accordance with the second embodiment is shown in FIGS. 4–6. As described hereinabove, the stationary plug part 131 is arranged on the rear wall 137 of the headlight housing 110 and has outwardly extending contact pins 133. A recess 154 which is open opposite to the mounting direction 48 of the releasable plug part 134 is formed between the contact pins 133 in the bottom 152 of the casing 132 of the plug part 131. The edges of the recess 154 divergently extent opposite to the mounting direction 48 so that the recess 154 expands opposite to the mounting direction 48. The recess 154 forms a U-shaped depression 156 in the bottom 152 so as to surround it. The legs of the U-shape face the opening 120.

The releasable plug part 134 has the electrically insulating casing 135, in which the contact sleeves 136 are arranged. They are open through the end side 150 of the casing 132 facing in the mounting direction 48. The casing 135 of the plug part 134 has a depression 158 which is open in the mounting direction 48. An elastically deformable finger 160 projects from its bottom 169 of one piece with it in the mounting direction 48 and extends transversely to the mounting direction 48. The free end of the finger 160 extends over the end side 150 of the casing 135 outwardly and in not mounted condition, in other words in the initial condition of the plug part 134, is located substantially parallel to the mounting direction 48. A U-shaped edge 162 projects from the end side 150 of the casing 135 in the mounting direction 48 and surrounds the finger 160. The finger 160 is surrounded at three sides, however it is open at the side facing the opening 120. The edge 162 extends in the mounting direction 48 substantially as far as the finger 160.

The cover 122, as in the first embodiment, is releasably connectable from outside of the headlight housing 110, with the headlight housing 110 for closing the opening 120. For example, the releasable connection is an arresting connection or a connection provided with other mounting elements. The cover 122 has an arm 146 which, in its position in which it closes the opening 120, extends outwardly over the edge of the opening 120. It partially overlaps the stationary plug part 131. The arm 146, as shown in FIG. 6, has a U-shaped cross-section. It is molded through the legs of the U-shape on the cover 122, and an intermediate space remains between the legs. The edges of the legs of the arms 146 which face opposite to the mounting direction 48 are narrowing, and they are inclined at their facing sides. The legs of the arm 146 are arranged near the recess 154.

For mounting, the releasable plug part 134 is moved in the mounting direction 48 toward the stationary plug part 131.

The plug part 134 is located in its initial position, or in other words the finger 160 extends substantially parallel to the mounting direction 48. The finger 160 in this initial position of the plug part 134 meets the bottom 152 of the stationary plug part 131 and cannot extend into the recess 154 since it is offset. The length of the finger 160 is selected with respect to the length of the contact pin 133 so that when it abuts against the bottom 152, the contact pins 133 do not enter the contact sleeves 136. When the finger 160 has the greater length, it will be possible that the plug part 134 is mounted so that the finger 160 with its end facing the mounting direction 48 is introduced into the recess 154. Subsequently, under the action of force the finger 160 can be bent on the plug part 134 so that the contact pins 133 can be inserted into the contact sleeves 136. This must however be avoided. The finger 160 remains thereby a part of the releasable plug part 134 which is elastically deformable transverse to the mounting direction 48 of the releasable plug part 134. In its initial position shown in FIG. 5, the electrically conductive connection of the releasable plug part 134 with the stationary plug part 131 is prevented. The recess 154 forms a receptacle for the finger 160, while in the initial position it is offset.

When the cover 122 is located in its position in which it closes the opening 120, its arm 146, as described above, projects over the stationary plug part 131. If the releasable plug part 134 now is moved in the mounting direction 48 toward the stationary plug part 131, the end of the finger 160 facing the mounting direction 48 first meets the leg of the arm 146 and slides during the further movement of the plug part 134, in the mounting direction 48 on the inclined edge of the leg and also is bent with elastic deformation toward the recess 154. The arm 146 is surrounded by the edge 162 of the releasable plug part 134 so that it cannot deviate transversely to the mounting direction 48. During further movement of the plug part 134 in the mounting direction 48, the finger 160 is inserted in the recess 154 and the edge 162 is introduced in the depression 158 in the casing 132 of the stationary plug part 131. The contact pins 133 are introduced into the contact sleeves 136, so that the connection of the gas discharge lamp 14 with the voltage source 26 is established. The finger 160 of the plug part 134 is thereby moved by the arm 146 during the mounting of the releasable plug part 134 from its initial position shown in FIG. 5 to its mounting position shown in FIG. 4. In this position the electrically conductive connection with the stationary plug part 131 is no longer prevented. The finger 160 is then assembled with the recess 154 of the stationary plug part 131 which forms the receptacle, or in other words is insertable into it.

With the mounted releasable plug part 134, the arm 146 of the cover 122 is arranged between the stationary plug part 131 and the releasable plug part 134. A removal of the cover 122 for releasing the opening 120 is then not possible, since the arm 146 cannot be pulled out. A removal of the cove 122 is possible only after the releasable plug part 134 is dismounted, and thereby the connection of the gas discharge lamp 14 with the voltage source 26 is interrupted.

With the above described plug connection 30 or 130, also further electrical consumers of the headlight such as for example further light sources and adjusting devices for adjustment of the light width of the light bundle emitted by the headlight, can also be connected with the voltage source. In this case it suffices to provide on the headlight only one plug connection 30 or 130.

It will be understood that each of the elements described above, or two or more together, may also find a useful application in other types of constructions differing from the types described above.

While the invention has been illustrated and described as embodied in a headlight for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for a vehicle, comprising a housing; a gas discharge lamp arranged in said housing and having an opening; a closing part arranged to close said opening of said housing; a voltage source with which said gas discharge lamp is connectable; a plug connection provided for connecting said gas discharge lamp with said voltage source and including a stationary plug part arranged on said housing and a releasable plug part arranged outside of said housing, said closing part being releasable from outside of said housing for releasing said opening and having an extremity which in a position in which said closing part closes said opening extends in said plug connection, said releasable plug part being elastically deformable at least in a region and in an initial condition before its mounting has a shape in which it is not electrically conductively connectable with said stationary plug part, said releasable plug part during its mounting being brought by said extremity of said closing part by elastic deformation to a mounting form in which it is electrically conductively connectable with said stationary plug part, said extremity of said closing part, when said releasable plug part is mounted being blocked between said releasable plug part and said stationary plug part.

2. A headlight as defined in claim 1, wherein said releasable plug part has an elastically deformable part which extends transverse to a mounting direction and is bringable by said extremity of said closing part from an initial position into a mounting position, said elastically deformable part in said initial position preventing an electrically conductive connection of said releasable plug part with said stationary plug part.

3. A headlight as defined in claim 2, wherein said stationary plug part has a receptacle which cooperates with said elastically deformable part of said releasable plug part, said receptacle being formed so that said elastically deformable part is offset relative to said receptacle in said initial position, while in said mounting position said receptacle is assembled with said elastically deformable part.

4. A headlight as defined in claim 1, wherein each of said plug parts has an electrically insulating casing, one of said plug parts having at least one contact pin projecting from said at least one plug part and forming an electric contact element, while the other of said plug parts has at least one contact sleeve arranged on said at least one plug part and forming another contact element, so that during mounting of said releasable plug part in an initial condition said contact pin of said at least one contact part meets said casing of said other plug part.

5. A headlight as defined in claim 4, wherein said casing of said releasable plug part has at least two shape stable portions each provided with at least one electrical contact element which are connected with one another by an elastically deformable portion so that in an initial condition of said releasable plug part at least one of said shape stable portions is located in such an initial position in which its contact element does not meet the associated contact element of the stationary plug part.

6. A headlight as defined in claim 5, wherein said elastically deformable portion is located near an edge of said casing which is opposite to a mounting direction of said releasable plug part, said shape stable portions being formed so that an open intermediate space remains which is open in said mounting direction, and during mounting of said releasable mounting part said extremity of said closing part is introduced in said intermediate space and at least one portion is moved from an initial position with deformation of said elastic portion to a mounting position in which said contact element of said at least one portion meets said associated contact element of said stationary plug part.

7. A headlight as defined in claim 1, wherein each of said plug parts has an electrical insulating casing, said casing of said releasable plug part having a projection extending in a mounting direction and elastically deformable transversely to said mounting direction, said casing of said stationary plug part having a recess which is formed as a receptacle for said projection, said projection in an initial position being offset relative to said recess, and said projection during mounting of said releasable plug part being brought by said extremity of said closing part to a mounting position in which it is introduced in said recess.

8. A headlight as defined in claim 7, wherein said casing of said releasable plug part has an edge projecting in said mounting direction and surrounding said projection or a part of its periphery with a distance therefrom, said casing of said stationary plug part having a depression for receiving said edge so that said extremity of said closing part is located between said projection and said edge.

* * * * *